Patented May 29, 1923.

1,456,540

UNITED STATES PATENT OFFICE.

NORMAN E. DITMAN, OF NEW YORK, N. Y.

REGENERATED CELLULOSE MATERIAL AND PROCESS OF MAKING SAME.

No Drawing.    Application filed March 9, 1921.   Serial No. 450,961.

*To all whom it may concern:*

Be it known that I, NORMAN E. DITMAN, a citizen of the United States of America, residing at New York, in the county and State of New York, have invented certain new and useful Improvements in Regenerated Cellulose Materials and Processes of Making Same, of which the following is a full, clear, and exact description.

The present invention relates to the manufacture of solutions or liquids such as are used for the manufacture of regenerated cellulose structures, such as threads, films, coatings, plastic compositions and the like, the said solutions or liquids containing dissolved cellulose and related carbohydrates.

Heretofore the most commonly employed cellulosic material has been cotton, wood pulp made from trees, and like materials. I have found that great economy can be produced in the process, if mature, dried corn cobs are used as the starting material in place of the cotton or the like heretofore used. Furthermore, I find that by the use of corn cobs ultimate products are produced which have highly desirable qualities including high tensile strength, and also the products have other good physical properties as compared with the products made by like procedure from cotton. It may be called to attention that mature, dried corn cobs are available in very large quantities and can be purchased at very low prices. These cobs constitute a waste product at present, being the dried cobs left after removing the dried corn for use as grain. The present specification has no reference whatever to immature corn cobs, nor to corn stalks, corn (grain), leaves of the corn plant, nor to the natural "corn silk". In fact, in many localities a given weight of corn cobs can be secured for as little as one-ninetieth of the cost of an equivalent amount of cotton.

As above stated, the essential novel feature of the present invention comprehends the use of mature, dried corn cobs as a starting material. Corn cobs consist largely of cellulose, lignin, certain carbohydrate gums and some other carbohydrate materials known as xylose and xylan. The corn cobs to be treated may first be run through some kind of a device in which the adhering dirt and the like is conveniently removed. The cobs are then preferably run through a comminuting device for reducing the size of the particles. After comminuting, the material may be graded and if desired any undesired portions can be discarded. This operation, however, is not necessary, but if performed it may include such steps as sifting, winnowing and the like.

The cob material is preferably subjected to a chemical treatment for the removal of such ingredients as are undesirable in the finished product, this treatment may conveniently embrace boiling with water containing alkali. The boiling may be continued for twelve to twenty hours more or less if desired under pressure of 30 to 111 lbs. The strength of the alkali here used can vary considerably, for example a 10% solution can be used. The residue is then preferably washed and dried. It may be subjected to a bleaching operation if desired. If caustic soda be employed it would be preferably in the percentage of 10% or more, while if soda ash be employed it would preferably be in the percentage of 1% or more.

The purified cob material, as above described, is then subjected to a process of solution using either the viscose process or the cuprammonium process.

*Example 1.*—100 parts of the purified cob material are placed in a concentrated solution of caustic alkali, a solution of caustic soda of about 15% to 25% being preferred. The material after standing for a time, say 5 hours more or less, is then run through a filter press or squeezing device in which the content of liquid is pressed down to about 33%. The material is allowed to stand in this condition for 48 to 60 hours, after which it is placed into a closed container, the temperature lowered to about 16° C., and carbon bisulfid added equivalent to about 10% to 33% of the weight of the purified cob material treated. The temperature is carefully controlled and is not allowed to exceed 30° C. After the treatment with the carbon bisulfid for a sufficient length of time for the reaction, (say ½ to 2 hours), the latter is drained off and water containing a small amount of sodium hydroxide is added. Viscose is formed which may be separated from any insoluble products by decantation or filtration.

*Example 2.*—1 to 10 parts by weight of the purified cob material is treated with 100 parts of a cuprammonium solution preferably prepared by adding cuprous chlorid to strong ammonia water (containing about 28% $NH_3$) and agitating until a substantially saturated solution is produced. This solution may be separated from any insoluble products by decantation or filtration.

The solution as produced in examples 1 and 2 may be precipitated in the usual manner, or in any desired manner, to produce regenerated cellulose. Obviously, the precipitation method will depend upon the particular product which it is desired to produce. It is understood that various modifying agents having known effects can be added, either with the cob material to the solvent or to the solution of the cob material in the solvent. The subsequent treatment of the regenerated cellulose structure can likewise be modified in accordance with processes heretofore proposed in connection with the treatment of solutions made from cotton and like cellulosic materials.

In addition to the fact that corn cob material as described herein is very much cheaper than cotton and like materials, a particularly valuable feature of the present invention is that the threads or other regenerated cellulose structures ultimately produced are stronger than those produced from the more expensive cotton.

Other advantages incident to the use of corn cobs are that the latter are more easily comminuted than wood. Furthermore the products not desired in subsequent steps of cellulose preparation are more easily converted and disposed of by chemical means in the case of corn cobs than with wood.

It is to be understood that in place of the specific solvents which I have mentioned, any of the known solvents of cellulose can be employed.

I have described the purification of the corn cob material in accordance with what has been found to give highly advantageous results. It is to be understood, however, that in case crude products are being made the whole purification operation or any desired portions thereof may be omitted.

So far as I have been advised, the use of mature, dried corn cobs, for the production of regenerated cellulose structures (artificial silk, etc.) is novel and any use of mature, dried corn cobs, for the stated purposes, is intended to fall within the scope of my patent.

While I believe that the superiority of the artificial silk, etc. made from corn cobs, over that made from cotton is due, at least in large part, to the presence of certain vegetable gums, xylan, xylose, etc., I do not desire to limit myself to any specific theory.

I claim:

1. A process of preparing solutions suitable for production of regenerated cellulose structures which embraces the step of dissolving cellulosic corn cob material of corn cobs, including substantially all of the water-insoluble organic constituents of mature, dried corn cobs, in a solvent.

2. A process of preparing solutions suitable for production of regenerated cellulose structures which embraces the step of reacting upon cellulosic corn cob material of mature, dried corn cobs, with an alkaline reagent capable of reacting therewith to dissolve the same.

3. A process of preparing solutions suitable for production of regenerated cellulose structures which embraces the step of dissolving cellulose corn cob material of mature corn cobs, in a caustic alkali and carbon bisulfid combination.

4. A process which comprises dissolving from mature corn cob material, the ingredients which are readily soluble in dilute alkali solution, and dissolving the residual portion of the cob material in a cellulose solvent.

5. As a new product of manufacture, a solution containing substantially the entire water-insoluble organic constituents of corn cobs.

6. As a new product of manufacture, a solution containing the soluble derivatives cellulose of mature corn cobs, and containing also those soluble derivatives of other carbohydrates of corn cobs which are not removable by boiling the cobs with a dilute alkali solution and washing.

7. As a new product, a regenerated cellulose structure containing in addition to cellulose, at least a substantial portion of those ingredients of mature corn cobs which are not removable therefrom by boiling with dilute alkali solution.

8. Artificial silk containing the regenerated water-insoluble constituents of corn cobs.

In testimony whereof I hereto affix my signature.

NORMAN E. DITMAN.